United States Patent
Stählin et al.

(10) Patent No.: US 11,930,387 B2
(45) Date of Patent: Mar. 12, 2024

(54) METHOD FOR FILTERING VEHICLE-TO-X MESSAGES, VEHICLE-TO-X COMMUNICATION DEVICE, AND COMPUTER-READABLE STORAGE MEDIUM

(71) Applicant: Continental Teves AG & Co. oHG, Frankfurt am Main (DE)

(72) Inventors: Ulrich Stählin, Nuremberg (DE); Richard Scherping, Nuremberg (DE)

(73) Assignee: Continental Teves AG & Co. oHG (DE)

( * ) Notice: Subject to any disclaimer, the term of this patent is extended or adjusted under 35 U.S.C. 154(b) by 422 days.

(21) Appl. No.: 17/278,769

(22) PCT Filed: Sep. 5, 2019

(86) PCT No.: PCT/DE2019/200108
§ 371 (c)(1),
(2) Date: Mar. 23, 2021

(87) PCT Pub. No.: WO2020/064066
PCT Pub. Date: Apr. 2, 2020

(65) Prior Publication Data
US 2022/0038936 A1    Feb. 3, 2022

(30) Foreign Application Priority Data

Sep. 28, 2018  (DE) .................... 10 2018 216 789.3
Jan. 22, 2019  (DE) .................... 10 2019 200 732.5

(51) Int. Cl.
H04W 28/02    (2009.01)
H04W 4/40     (2018.01)

(52) U.S. Cl.
CPC ........... *H04W 28/021* (2013.01); *H04W 4/40* (2018.02)

(58) Field of Classification Search
CPC ....... H04W 28/021; H04W 4/40; H04W 4/50; H04L 69/28; H04L 67/12; H04L 67/5651; H04L 67/62; H04L 45/74; H04L 63/1458
See application file for complete search history.

(56) References Cited

U.S. PATENT DOCUMENTS 8,314,718 B2    11/2012  Muthaiah et al.
8,412,107 B2    4/2013   Hamada et al.
(Continued)

FOREIGN PATENT DOCUMENTS

CN    105493164 A      4/2016
DE    102010046843 A1  6/2011
(Continued)

OTHER PUBLICATIONS

Chinese Office Action for Application No. 201980055946.9, dated May 25, 2023 with translation, 10 pages.
(Continued)

*Primary Examiner* — Farid Seyedvosoghi
(74) *Attorney, Agent, or Firm* — Buchanan, Ingersoll & Rooney PC

(57) ABSTRACT

A method for filtering vehicle-to-X messages, having the following steps: receiving a number of vehicle-to-X messages and adapting a filter parameter for filtering the received vehicle-to-X messages in such a manner that a number of vehicle-to-X messages to be discarded leaves a number of vehicle-to-X messages to be processed from the number of received vehicle-to-X messages. The adaptation is carried out on the basis of a correction value for describing a deviation of the number of vehicle-to-X messages to be processed in a specified duration from a number of vehicle-to-X messages provided for processing in the specified
(Continued)

duration. Also disclosed are a corresponding vehicle-to-X communication device and to a computer-readable storage medium.

13 Claims, 3 Drawing Sheets

(56) References Cited

U.S. PATENT DOCUMENTS

| | | |
|---|---|---|
| 9,882,791 B2 | 1/2018 | Grotendorst et al. |
| 9,959,751 B2 | 5/2018 | Scherping et al. |
| 9,985,900 B2 | 5/2018 | Stählin et al. |
| 10,454,838 B2 | 10/2019 | Stählin et al. |
| 2016/0203711 A1* | 7/2016 | Scherping ............ G08G 1/0104 370/310 |
| 2016/0301615 A1* | 10/2016 | Stählin .................... H04W 4/40 |
| 2018/0069800 A1 | 3/2018 | Stählin et al. |
| 2018/0139593 A1 | 5/2018 | Chun et al. |

FOREIGN PATENT DOCUMENTS

| | | |
|---|---|---|
| DE | 102014213771 A1 | 2/2015 |
| EP | 3085123 B1 | 2/2018 |
| WO | 2009133740 A1 | 11/2009 |
| WO | 2016166230 A1 | 10/2016 |

OTHER PUBLICATIONS

Japanese Notice of Reasons for Refusal for Japanese Application No. 2021-504240, dated Mar. 31, 2023 with translation, 6 pages.
International Search Report and Written Opinion for International Application No. PCT/DE2019/200108, dated Nov. 14, 2019, with partial English translation, 15 pages.
International Search Report and Written Opinion for International Application No. PCT/DE2019/200108, dated Nov. 14, 2019, 13 pages (German).
German Search Report for German Application No. 10 2019 200 732.5, dated Jul. 15, 2019, with partial English translation, 11 pages.
English translation of Japanese Office Action for Japanese Application No. 2021-504240, dated Oct. 6, 2023, 3 pages.

* cited by examiner

METHOD FOR FILTERING VEHICLE-TO-X MESSAGES, VEHICLE-TO-X COMMUNICATION DEVICE, AND COMPUTER-READABLE STORAGE MEDIUM

CROSS REFERENCE TO RELATED APPLICATIONS

This application is the U.S. National Phase Application of PCT International Application No. PCT/DE2019/200108, filed Sep. 5, 2019, which claims priority to German Patent Application No. 10 2018 216 789.3, filed Sep. 28, 2018 and German Patent Application No. 10 2019 200 732.5, filed Jan. 22, 2019, the contents of such applications being incorporated by reference herein.

FIELD OF THE INVENTION

The invention relates to a method for filtering vehicle-to-X messages and to a vehicle-to-X communication device and a computer-readable storage medium for executing such a method.

BACKGROUND OF THE INVENTION

Vehicle-to-X communication, also referred to as car-2-X communication, C2X communication or V2X communication, is in the process of being standardized in Europe and the USA and is currently on the way to series production.

With vehicle-to-X communication, the volume of received data is, in principle, very large in proportion to the data relevant to the specific applications executed in a vehicle. Frequently, only a few messages are really relevant to the applications, all of the other messages can in principle be discarded at an early stage by preprocessing in order to reduce the system load.

Although the benefits and the effectiveness of vehicle-to-X communication are based on a rapid introduction in as many vehicles as possible, it is unrealistic to assume that all vehicles will be equipped with the appropriate technology within a very short period of time. Especially at the start of the commercial launch of vehicle-to-X communication, only a few vehicles will be equipped with the appropriate technology so that preprocessing will not be necessary due to the low number of received messages. Only as vehicle-to-X communication becomes increasingly widespread will it be necessary to perform preprocessing in order to adapt the messages actually processed to the system performance. During the course of the life of a vehicle, a change will consequently be made from a condition in which sufficient computational power exists in order to be able to work without preprocessing, to a condition in which preprocessing will be necessary in order to continue to perform the applications with the existent computational power.

EP 3085123 B1, incorporated herein by reference, discloses a method for determining a number of vehicle-to-X messages to be discarded, wherein vehicle-to-X messages are received in a work cycle of a vehicle-to-X communication unit, wherein a number of received vehicle-to-X messages is determined in the work cycle and wherein an existent computational power is available in the work cycle. Taking account of the existent computational power in the work cycle, the number of vehicle-to-X messages to be discarded is then determined in accordance with the number of received vehicle-to-X messages. This results in the advantage that the existent computational power does not have to be designed for the existence of comparatively large computational power reserves since, as the number of received vehicle-to-X messages increases, more vehicle-to-X messages are increasingly discarded, that is to say the number of vehicle-to-X messages to be discarded likewise rises.

Classification parameters of a preprocessing method are additionally adapted in the work cycle such that the determined number of vehicle-to-X messages to be discarded leaves a number of vehicle-to-X messages to be processed, which exploits the existent computational power in the work cycle without exceeding said computational power. The classification parameters are adapted by way of an adaptation of thresholds.

WO 2016166230 A1, incorporated herein by reference, discloses a method for determining a channel load in a vehicle-to-X communication, in which a number of vehicle-to-X messages is received, a number of channel load parameters is ascertained based on the vehicle-to-X messages, and the channel load is ascertained based at least on the channel load parameters.

By means of said method it is possible to initially ascertain a number of channel load parameters which give some indication of the number of the vehicle-to-X messages received and to be processed and, if necessary, also of the computational power necessary for this. To this end, it is not only possible to have recourse to a simple method of counting messages, but channel load parameters can also be utilized, which especially take into account determined circumstances regarding the processing of determined messages and the necessary outlay for this and the required computational power.

However, the parameters are merely adapted in the event of stipulated thresholds being exceeded or fallen short of, so that the parameters are not being constantly dynamically adapted, for example with the aid of the channel load.

SUMMARY OF THE INVENTION

It is therefore an aspect of the invention to provide a method for filtering vehicle-to-X messages and a corresponding vehicle-to-X communication device and a computer-readable storage medium, by means of which a more efficient implementation of the filtering of vehicle-to-X messages or more efficient implementation as such is made possible.

This is achieved according to an aspect of the invention by a method for filtering vehicle-to-X messages and a vehicle-to-X communication device or a computer-readable storage medium according to the main claims. Advantageous configurations can, for example, be inferred from the respective subclaims. The content of the claims refers expressly to the content of the description.

An aspect of the invention describes a method for filtering vehicle-to-X messages, having the following steps:
  receiving, in particular by means of a vehicle-to-X communication device, a number of vehicle-to-X messages and
  adapting a filter parameter for filtering the received vehicle-to-X messages in such a manner that a number of vehicle-to-X messages to be discarded leaves a number of vehicle-to-X messages to be processed, wherein the adaptation of the filter parameter is carried out on the basis of a correction value, using a deviation of the number of vehicle-to-X messages to be processed within a specified duration from a number of vehicle-to-X messages provided for processing within the specified duration.

The idea which forms the basis of an aspect of the invention is to realize a constant dynamic adaptation of the filter parameter in such a manner that the number of the vehicle-to-X messages to be processed makes possible a resource utilization which is as optimal as possible. The adaptation of the filter parameter is ascertained on the basis of a deviation between the number of vehicle-to-X messages to be processed within the specified duration and a number of vehicle-to-X messages provided for the processing within the very same specified duration. An advantage of the described method is that a specified optimum utilization in the event of changing entry conditions, in particular in the event of an altering rate of received vehicle-to-X messages and/or changing distribution of the message contents which, in turn, influence the adaptation of the filter parameter, is observed, and that a comparatively low number of calculations is necessary for the respective adaptations. This makes possible an efficient filtering of vehicle-to-X messages and a comparatively simple and resource-sparing implementation and, therefore, the utilization of electronic computing modules having less computational power, which are therefore less expensive, for processing received vehicle-to-X messages. In addition, the existent computational power of an underlying communication device can be better exploited. Expediently, the method can accordingly be executed within the framework of preprocessing of received vehicle-to-X messages.

The filter parameter is adapted in accordance with an embodiment by way of adapting at least one threshold.

The described method can be advantageously executed by means of a correspondingly configured vehicle-to-X communication device.

The method is in particular executed by means of a vehicle-to-X communication device of a receiver of the vehicle-to-X messages. Both the receiver and the sender(s) of the vehicle-to-X messages are, for example, vehicles. A vehicle can, for example, be a motor vehicle, in particular a car, a truck, a motorcycle, an electric vehicle or a hybrid vehicle, a watercraft or an aircraft.

In accordance with an embodiment, a classification based on the contents of the received vehicle-to-X messages is effected prior to the filtering of the vehicle-to-X messages. According to a further development, the filtering relates to the correspondingly classified message contents. Message contents, the underlying physical variables of which have a substantially continual course, e.g. position, speed, received signal strength indicator (RSSI) of the received vehicle-to-X signals and/or course of the sender originally outputting the message, are expediently used for this. In the case of, for example, the position, the application corresponds to the described procedure, the classification and subsequent filtering, of a particularly efficient possible implementation for realizing the adaptation of the radius around the vehicle, in which road users have to be located, in order to be evaluated as being relevant.

In accordance with an embodiment, the adaptation of the filter parameter is carried out if a deviation between the number of vehicle-to-X messages to be processed within or based on the specified duration and the number of vehicle-to-X messages provided for the processing within or based on the specified duration is ascertained.

In accordance with an embodiment, the correction value is determined, taking account of whether a rising or falling rate of received vehicle-to-X messages exists. If the number of vehicle-to-X messages specified for processing is reached or exceeded before the specified duration is reached or exceeded, a rising rate of incoming vehicle-to-X messages in particular exists. If the specified duration is reached or exceeded before the number of vehicle-to-X messages specified for processing is reached or exceeded, a falling rate of incoming vehicle-to-X messages in particular exists. As a reference point or start point for durations and/or counts, a time of a last adaptation of the filter parameter is, in each case, in particular key and/or an initial value. The filter parameter is therefore adapted independently of a temporally fixed work cycle of an underlying system, e.g. of a corresponding computing apparatus. Consequently, a comparatively simple implementation in an inherently packet-oriented function, which is optimized for packet-oriented processing, can also advantageously be realized.

In accordance with an embodiment, the filter parameter is adapted or the correction value is ascertained, on reaching or exceeding the specified duration, in particular since a last adaptation.

In accordance with an embodiment, time information for reproducing a duration since an immediately preceding adaptation of the filter parameter, and/or counter information which can be provided in particular by means of a message counter of an underlying vehicle-to-X communication device in order to reproduce a number of vehicle-to-X messages since an immediately preceding adaptation of the filter parameter, is/are used for ascertaining the correction value. Consequently, there is advantageously no need for an intermediate storage of messages, e.g. by means of a FIFO buffer store. As a result, the computing resources to be kept available in order to realize the filtering can be comparatively low.

In accordance with an embodiment, the correction value is determined in the event of a falling rate of received vehicle-to-X messages, using a ratio value of the specified duration to a duration up to a time at which the number of vehicle-to-X messages to be processed has reached or exceeded the number provided for processing.

In the event of a falling rate of received vehicle-to-X messages, the correction value is determined, in accordance with an embodiment, using a ratio value of the number of vehicle-to-X messages to be processed, for which the specified duration has been reached or exceeded, to the number of vehicle-to-X messages specified for processing.

According to a further development, the ascertained correction value is taken as a basis for a control method for controlling the number of vehicle-to-X messages to be processed. An advantage which results therefrom is the possibility of applying the method and findings of control technology to the filtering of vehicle-to-X messages.

According to a further development, the control method is configured with respect to a message rate in the specified duration. However, it can also be controlled with regard to a duration between successive messages, that is to say the reciprocal.

In accordance with an embodiment, the filter parameter is altered on a linear basis of the correction value. This corresponds to a known P-element from control technology which has a proportional transmission behavior. In accordance with at least one further embodiment, an alteration of at least one of the filter parameters can be provided on the basis of at least one extended controller concept, e.g. PI controller, PID controller, PD controller, state controller, cascade controller.

In accordance with an embodiment, the adaptation of the filter parameter is carried out on or following the expiration of the specified duration.

In accordance with an embodiment, the correction value is arithmetically applied to the filter parameter in order to adapt the filter parameter.

In accordance with an embodiment, when utilizing a scalar threshold and in the realization of a P controller, merely two multiplications are required in each case for the realization following the expiration of the specified duration or after reaching or exceeding the number of vehicle-to-X messages provided for the processing.

Expediently, the number of vehicle-to-X messages provided for the processing and/or the specified duration is/are configured in such a manner that, on the one hand, the filtering can be executed sufficiently dynamically, in particular in order to avoid a message overflow, which corresponds to a specified duration which is as low as possible, on the other hand however a continuity of the specified values is retained, in order to keep the resource implications of the controller as low as possible or to avoid an oscillating system.

According to a further development, the vehicle-to-X messages can be output or received by means of at least one of the following connection types:
  WLAN connection, in particular in accordance with IEEE 802.11p,
  cellular V2X (C-V2X), using a mobile network and/or by means of direct connection, e.g. 3G/4G/5G or successor generations,
  ISM connection (Industrial, Scientific, Medical Band),
  Bluetooth® connection,
  ZigBee connection,
  UWB connection (Ultra-Wide Band),
  WiMax® connection (Worldwide Interoperability for Microwave Access),
  infrared connection and
  mobile radio connection.

These connection types offer different advantages, depending on the type, wavelength and data protocol utilized. Thus, some of the indicated connection types make possible e.g. a comparatively high data transfer rate and a comparatively rapid connection establishment, whereas others are mostly suitable for data transfer around visual obstacles. The combination and simultaneous or parallel utilization of several of these connection types produce further advantages, since the disadvantages of individual connection types can be offset as well.

Furthermore, an aspect of the invention relates to a vehicle-to-X communication device which is configured to execute at least one embodiment of the method according to an aspect of the invention. The vehicle-to-X communication device comprises, according to a further development, a computing apparatus, e.g. a processor, and a data memory, wherein program code is stored in the data memory and, when said program code is run, the computing apparatus executes such a method.

Furthermore, an aspect of the invention relates to a computer-readable storage medium which contains program code, when said program code is run by a computing apparatus or by a vehicle-to-X communication device a method according to an aspect of the invention is executed according to one or more of the embodiments described herein.

Both the vehicle-to-X communication system and the computer-readable storage medium can have recourse to all of the embodiments and variants of the method according to an aspect of the invention, which are described herein.

BRIEF DESCRIPTION OF THE DRAWINGS

Further embodiments within the meaning of an aspect of the invention are described below with reference to the appended drawings, wherein.

DETAILED DESCRIPTION OF THE PREFERRED EMBODIMENTS

Figure 1:
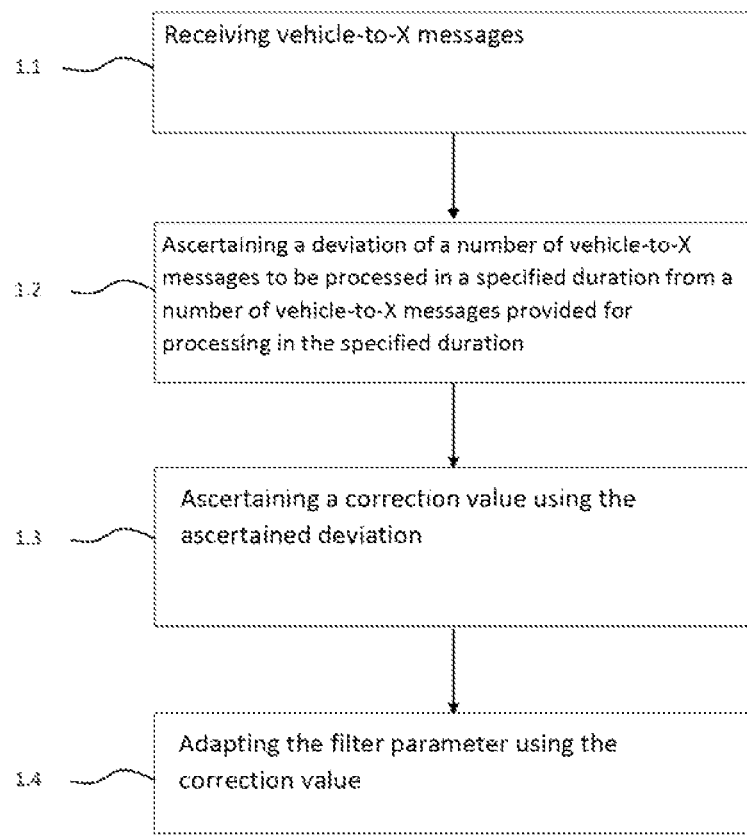
FIG. 1 shows a flow chart of an exemplary embodiment of the method according to the invention.

FIG. 1 shows an exemplary embodiment of the method for filtering vehicle-to-X messages according to the invention. In a step 1.1, a number of vehicle-to-X messages is received by means of a vehicle-to-X communication device. Based on the received vehicle-to-X messages, a deviation of a number of vehicle-to-X messages to be processed in a specified duration from a number of vehicle-to-X messages provided for processing in the specified duration is ascertained in a step 1.2. In a step 1.3, a correction value is ascertained, using the ascertained deviation. In a step 1.4, the filter parameter is adapted in such a manner that a number of vehicle-to-X messages to be discarded leaves the number of vehicle-to-X messages to be processed from the number of received vehicle-to-X messages.

Figure 2:
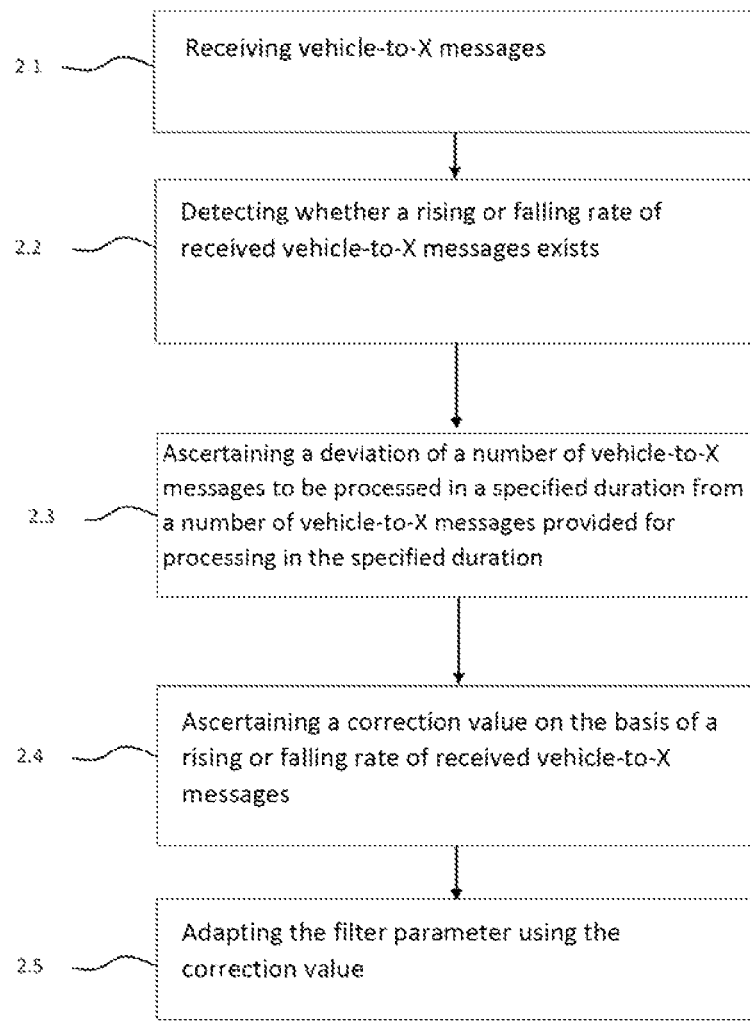
FIG. 2 shows a flow chart of a further exemplary embodiment of the method according to the invention.

FIG. 2 shows a further exemplary embodiment of the method for filtering vehicle-to-X messages according to the invention. In a step 2.1, a number of vehicle-to-X messages is received by means of a vehicle-to-X communication device. On reaching or exceeding the specified duration, it is checked in a step 2.2 whether a rising or falling rate of received vehicle-to-X messages exists, wherein according to an example a rising rate of received vehicle-to-X messages is taken as a basis if the number of vehicle-to-X messages to be processed has reached or exceeded the number of vehicle-to-X messages to be provided for processing prior to the expiration of the specified duration, and a falling rate of received vehicle-to-X messages is taken as a basis if the number of vehicle-to-X messages to be processed has not reached or exceeded the number of vehicle-to-X messages provided for processing on reaching or achieving the specified duration. Based on the received vehicle-to-X messages, in a step 2.3, a deviation of a number of vehicle-to-X messages to be processed in a specified duration from a number of vehicle-to-X messages provided for processing in the specified duration is ascertained. In step 2.4, the correction value is ascertained in the event of a falling rate of received vehicle-to-X messages, using a ratio value of the specified duration to a duration up to a time at which the number of vehicle-to-X messages to be processed has reached or exceeded the number provided for processing. In the event of a falling rate of received vehicle-to-X messages, in step 2.4, the correction value is ascertained, using a ratio value of the number of vehicle-to-X messages to be processed, for which the specified duration has been reached or exceeded, to the number of vehicle-to-X messages provided for processing. In a step 2.5, the filter parameter is adapted in such a manner that a number of vehicle-to-X messages to be discarded leaves the number of vehicle-to-X messages to be processed from the number of received vehicle-to-X messages.

Figure 3:
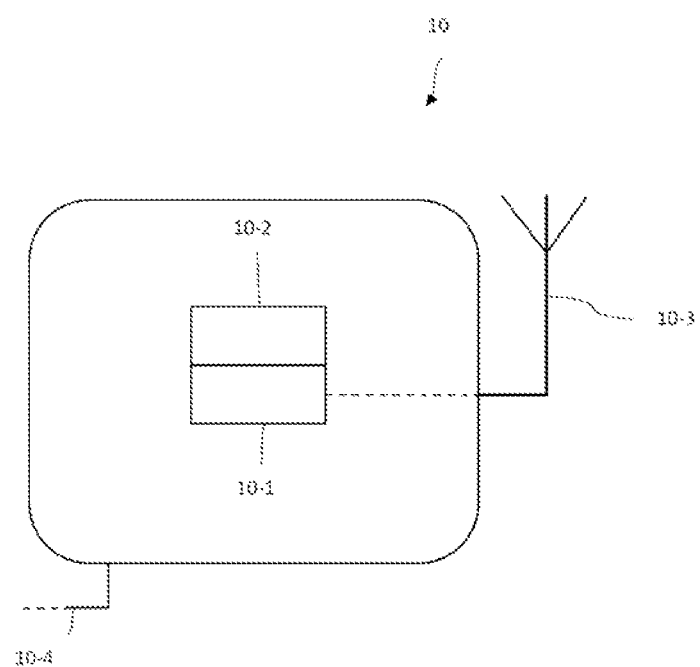
FIG. 3 shows a block diagram of an exemplary embodiment of a vehicle-to-X communication device according to the invention.

FIG. 3 shows a block circuit diagram of an exemplary embodiment of a vehicle-to-X communication device 10 according to the invention. The communication device comprises, according to an example, a computing apparatus 10-1, a data memory 10-2 and an antenna 10-3 for vehicle-to-X communication. The device is configured to communicate with other electronic systems, for example vehicle assistance systems, by means of a data transfer interface 10-4. The vehicle-to-X communication device 10 is configured to execute at least one embodiment of the method according to the invention and, consequently, of the exemplary method, which has been described with the aid of FIG. 1 or FIG. 2.

It should be understood that the vehicle-to-X communication module 10 is typically integrated into a motor vehicle, for example an automobile, a bicycle or a truck or is provided for such an integration and is utilized accordingly. It should, furthermore, be understood that the vehicle-to-X communication module 10 typically has interfaces with other vehicle components and further functionalities. This is not described in greater detail here in order to simplify the representation and the description.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which is therefore to be distinguished from other solutions which, for example, are based on a mobile network. For example, vehicle-to-X communication can take place utilizing the standards IEEE 802.11p or IEEE 1609.4. Vehicle-to-X communication can also be referred to as C2X communication. The sub-areas can be referred to as C2C (Car-to-Car) or C2I (Car-to-Infrastructure). An aspect of the invention expressly does not, however, exclude vehicle-to-X communication with the intermediary of, for example, a mobile network.

The indicated steps of the method according to an aspect of the invention can be executed in the indicated order. They can, however, also be executed in another order. A method according to an aspect of the invention can be executed in one of its embodiments, for example with a specific combination of steps, in such a manner that no further steps are executed. However, further steps can essentially also be executed, including those which are not indicated.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer having the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or exemplary embodiments and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are merely disclosed in the description or features which are disclosed in the description or a claim only in conjunction with other features can, in principle, be of independent inventive relevance. They can therefore also be included separately in claims to distinguish from the prior art.

The invention claimed is:

1. A method for filtering vehicle-to-X messages, having the following steps:
    receiving a number of vehicle to X messages; and
    adapting a filter parameter for filtering the received vehicle-to-X messages in such a manner that a number of vehicle-to-X messages to be discarded leaves a number of vehicle-to-X messages to be processed from the number of received vehicle-to-X messages, wherein the adaptation is carried out on the basis of a correction value, using a deviation of the number of vehicle-to-X messages to be processed in a specified duration from a number of vehicle-to-X messages provided for processing in the specified duration, and
    wherein time information for reproducing a duration since an immediately preceding adaptation of the filter parameter and/or counter information for reproducing a number of vehicle-to-X messages since an immediately preceding adaptation of the filter parameter is/are used for ascertaining the correction value.

2. The method according to claim 1, wherein the correction value is determined, taking account of a rising or falling rate of received vehicle-to-X messages.

3. The method according to claim 2, wherein a rising rate of received vehicle-to-X messages is taken as a basis if the number of vehicle-to-X messages to be processed has reached or exceeded the number of vehicle-to-X messages provided for processing prior to the expiration of the specified duration.

4. The method according to claim 3, wherein a falling rate of received vehicle-to-X messages is taken as a basis if the number of vehicle-to-X messages to be processed has not reached or exceeded the number of vehicle-to-X messages provided for processing on reaching or exceeding the specified duration.

5. The method according to claim 2, wherein a falling rate of received vehicle-to-X messages is taken as a basis if the number of vehicle-to-X messages to be processed has not reached or exceeded the number of vehicle-to-X messages provided for processing on reaching or exceeding the specified duration.

6. The method according to claim 1, wherein the correction value is taken as a basis for a control method for controlling the number of vehicle-to-X messages to be processed.

7. The method according to claim 1, wherein the adaptation of the filter parameter is carried out on or following the expiration of the specified duration.

8. The method according to claim 1, wherein the correction value is arithmetically applied to the filter parameter in order to adapt the filter parameter.

9. The method according to claim 1, wherein a classification based on the contents of the received vehicle-to-X messages is carried out prior to the filtering of the vehicle-to-X messages.

10. A vehicle-to-X communication device which is configured to execute a method according to claim 1.

11. A vehicle-to-X communication device comprising a non-transitory computer-readable storage medium which contains program code, when said program code is run by a computing apparatus or by a vehicle-to-X communication device configured to execute a method according to claim 1.

12. A method for filtering vehicle-to-X messages, having the following steps:
    receiving a number of vehicle-to-X messages; and
    adapting a filter parameter for filtering the received vehicle-to-X messages in such a manner that a number of vehicle-to-X messages to be discarded leaves a number of vehicle-to-X messages to be processed from the number of received vehicle-to-X messages, wherein the adaptation is carried out on the basis of a correction value, using a deviation of the number of vehicle-to-X messages to be processed in a specified duration from a number of vehicle-to-X messages provided for processing in the specified duration, and
    wherein the correction value is determined, in the event of a rising rate of received vehicle-to-X messages, using a ratio value of the specified duration to a duration up to a time at which the number of vehicle-to-X messages to be processed has reached or exceeded the number provided for processing.

13. A method for filtering vehicle-to-X messages, having the following steps:
    receiving a number of vehicle-to-X messages; and
    adapting a filter parameter for filtering the received vehicle-to-X messages in such a manner that a number of vehicle-to-X messages to be discarded leaves a number of vehicle-to-X messages to be processed from the number of received vehicle-to-X messages, wherein the adaptation is carried out on the basis of a correction value, using a deviation of the number of vehicle-to-X messages to be processed in a specified duration from a number of vehicle-to-X messages provided for processing in the specified duration, and
    wherein the correction value is determined, in the event of a falling rate of received vehicle-to-X messages, using a ratio value of the number of vehicle-to-X messages to be processed, for which the specified duration has been reached or exceeded, to the number of vehicle-to-X messages provided for processing.

* * * * *